United States Patent [19]

Clausen et al.

[11] Patent Number: 5,670,042

[45] Date of Patent: Sep. 23, 1997

[54] FUEL FILTER ASSEMBLY WITH REPLACEABLE ELEMENT HAVING INTEGRAL COVER

[75] Inventors: Michael D. Clausen, Turlock; Walter H. Stone, Modesto, both of Calif.

[73] Assignee: Parker Hannifin Corporation, Cleveland, Ohio

[21] Appl. No.: 79,662

[22] Filed: Jun. 18, 1993

[51] Int. Cl.$^6$ .................................................. B01D 35/02
[52] U.S. Cl. ........................ 210/238; 210/450; 210/454; 210/470; 210/493.2
[58] Field of Search ...................... 210/435, 443, 210/444, 453, 454, 238, 450, 452, 451, 470, 493.2; 220/304

[56] References Cited

U.S. PATENT DOCUMENTS

| | | | |
|---|---|---|---|
| 598,254 | 2/1898 | McLean . | |
| 1,175,948 | 3/1916 | French | 210/454 |
| 1,406,272 | 2/1922 | Morse | 210/454 |
| 1,468,906 | 9/1923 | Inman | 210/454 |
| 1,516,871 | 11/1924 | Stout | 210/454 |
| 1,648,773 | 11/1927 | Lundborg | 210/454 |
| 2,299,183 | 10/1942 | Shanor | 220/304 |
| 2,413,991 | 1/1947 | Newman | 210/457 |
| 2,464,036 | 3/1949 | Hasselwander | 210/457 |
| 3,061,105 | 10/1962 | Bradbury et al. | 210/454 |
| 3,061,106 | 10/1962 | Bradbury | 210/454 |
| 3,333,697 | 8/1967 | Rosaen | 210/172 |
| 3,970,566 | 7/1976 | Rosaen | 210/452 |
| 4,836,923 | 6/1989 | Popoff et al. | 210/232 |
| 5,312,546 | 5/1994 | Janik . | |

FOREIGN PATENT DOCUMENTS

WO92/05362   4/1992   WIPO .

*Primary Examiner*—Matthew O. Savage
*Attorney, Agent, or Firm*—Renner, Otto, Boisselle & Sklar, P.L.L.

[57] ABSTRACT

A fuel filter assembly (10) includes a housing (12) with an internal chamber (14) and inlet and outlet (18, 22). The chamber is bounded by an annular wall (16) and has an opening (30) at an upper end thereof. An element (26) is accepted in the chamber. The element includes a manually engagable cap portion (28) for closing the opening, and a disk shaped member (46). The disk shaped member has a deformable lip portion (50) for engaging the annular wall, and for fluidly separating an aperture (24) in connection with the outlet fitting, from an aperture (20) in fluid communication with the inlet fitting. A media body (54) of filter media (56) removes impurities from liquid flowing therethrough. Fuel flows from the inlet to the chamber and then through the media. From an interior area (60) of the media body, the fuel passes through a passage (62) into an intermediate area (52) and out the outlet. An element change may be accomplished without spilling or contacting the fuel, and without contaminants in the chamber reaching the aperture in fluid communication with outlet.

32 Claims, 4 Drawing Sheets

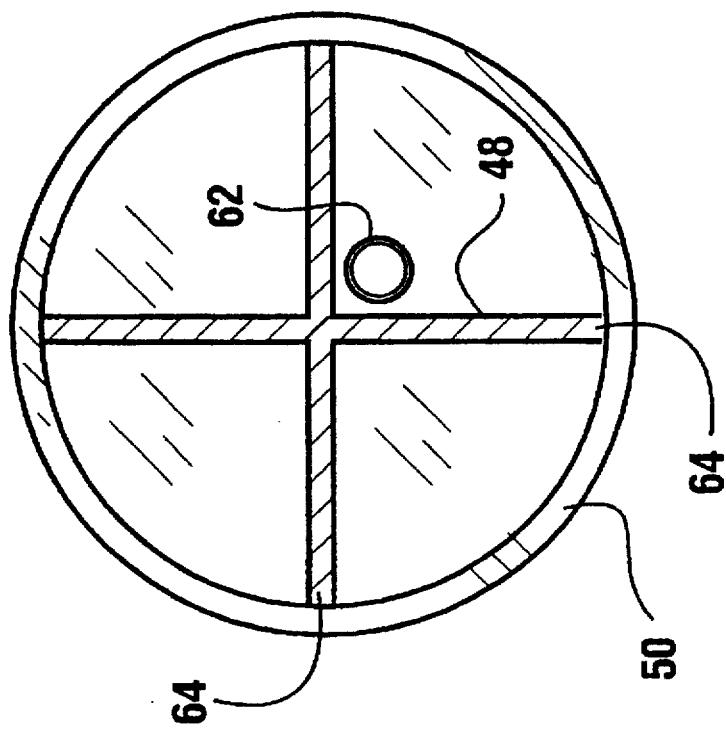
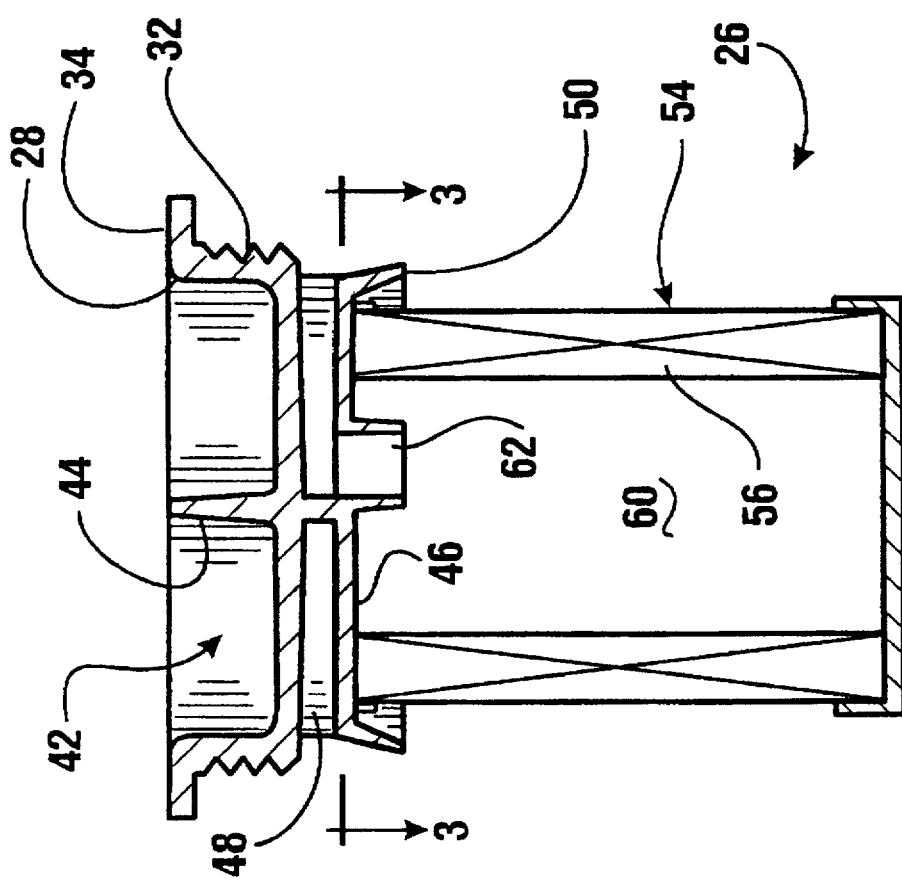

FUEL FILTER ASSEMBLY WITH REPLACEABLE ELEMENT HAVING INTEGRAL COVER

TECHNICAL FIELD

This invention relates to fluid filters. Specifically, this invention relates to a fuel filter with a replaceable element that filters liquid fuel which is delivered to an engine of a self-propelled vehicle.

BACKGROUND ART

Fuel filters of many types are known in the prior art. A popular type of fuel filter often used in trucks and other heavy vehicles is one that has a replaceable filter element. When in use, the element is housed in a filter housing. The housing is a permanent part of the vehicle fuel system.

Periodically the filter element in the assembly should be replaced. Prior art filter designs pose several drawbacks when it is necessary to change a filter element.

A common drawback associated with changing many types of prior art filter elements is that fuel is spilled out of the system into the environment during the element change. The loss of fuel not only poses a fire risk but is also an environmental problem.

Other prior art filter assemblies are made so that the person changing the filter element must have their hands in contact with the fuel. Such contact, particularly on a repeated basis, is undesirable.

A further drawback of some prior art filter housings is that when the element is changed, dirt that has collected in the housing or on the element, is suspended or falls off the element into the fuel. This dirt may migrate into the outlet of the filter housing and travel downstream in the fuel system. Such dirt may cause serious problems to downstream components such as a carburetor, fuel injection pump or fuel injectors.

U.S. Pat. No. 4,836,923, which is owned by the assignee of the present invention, discloses a fuel filter assembly that overcomes these drawbacks. The filter element of that design may be changed without spilling fuel or requiring the person carrying out the filter change to have skin contact with the fuel. Further, the fuel filter assembly is designed so that the possibility of migration of contaminants into the outlet during an element change is minimized.

While the design shown in U.S. Pat. No. 4,836,923 works well, it is a relatively expensive item to manufacture. This is because the design includes a housing with integral passages as well as a standpipe. Further cost is added through the use of an end cap for the filter element which includes an integral seal. All of these features add complexity and cost to the design.

Thus, there exists a need for a fuel filter assembly with a replaceable element that has the desirable characteristics previously discussed, but is less expensive to manufacture.

DISCLOSURE OF INVENTION

It is an object of the present invention to provide a fuel filter assembly with a replaceable element that may be changed without spilling fuel into the environment.

It is a further object of the present invention to provide a fuel filter assembly with a replaceable element that may be replaced without having skin contact with the fuel.

It is a further object of the present invention to provide a fuel filter assembly with a replaceable element that minimizes the risk that contaminants will pass out of the filter housing and reach downstream components of the fuel system as a result of an element change.

It is a further object of the present invention to provide a fuel filter assembly with a replaceable element that is relatively inexpensive to manufacture and service.

Further objects of the present invention will be made apparent in the following Best Modes for Carrying Out Invention and the appended claims.

The foregoing objects are accomplished in the preferred embodiments of the invention by a fuel filter assembly with a replaceable element. The fuel filter assembly has a housing with an inlet and an outlet. The housing also includes an internal chamber that is bounded circumferentially by an annular wall. The housing includes an opening at the top of the annular wall.

The inlet to the housing is in fluid communication with an aperture through the annular wall. The outlet is in fluid communication with a further aperture through the annular wall, that is disposed from the first aperture vertically upward and angularly therefrom.

The filter assembly includes a replaceable element. The element includes a cap portion. The cap portion is sized for closing the opening to the chamber. The cap portion includes outwardly directed threads which are adapted for engaging inwardly directed threads which extend about the annular wall.

The element includes a dividing means that includes a lip portion. The lip portion engages the annular wall between the aperture that is in fluid communication with the outlet, and the aperture that is in fluid communication with the inlet, when the element is positioned in the housing. The dividing means also bounds an intermediate area through which fluid may flow to the aperture in fluid communication with the outlet.

A body comprised of filter media is attached to the disk shaped member. The media body includes a ring of filter media for removing impurities in the fluid that flows therethrough. The media body encloses an interior area which houses fuel that has been purified by passage through the media. A fluid passage extends between the interior area of the media body and the intermediate area.

In operation, fuel enters the inlet of the housing and passes into the chamber through the aperture which is positioned below the lip portion of the dividing means. The fuel then passes through the media to the interior area of the media body. The clean fuel then passes upward through the fluid passage and flows through the intermediate area above the dividing means. Fuel then flows through the aperture above the lip portion and passes from the housing through the outlet.

The lip portion of the dividing means engages the annular wall and assures that fuel passing through the filter assembly must pass through the media to reach the outlet fitting. The dividing means also serves to keep impurities away from the aperture connected to the outlet when the element is being removed or installed. Both the housing and the element may be readily manufactured and serviced.

BRIEF DESCRIPTION OF DRAWINGS

FIG. 2 is a cross sectional view of the element shown in FIG. 1.

FIG. 3 is a cross sectional view of the web of the element taken along a line 3—3 in FIG. 2.

BEST MODES FOR CARRYING OUT INVENTION

Figure 1:
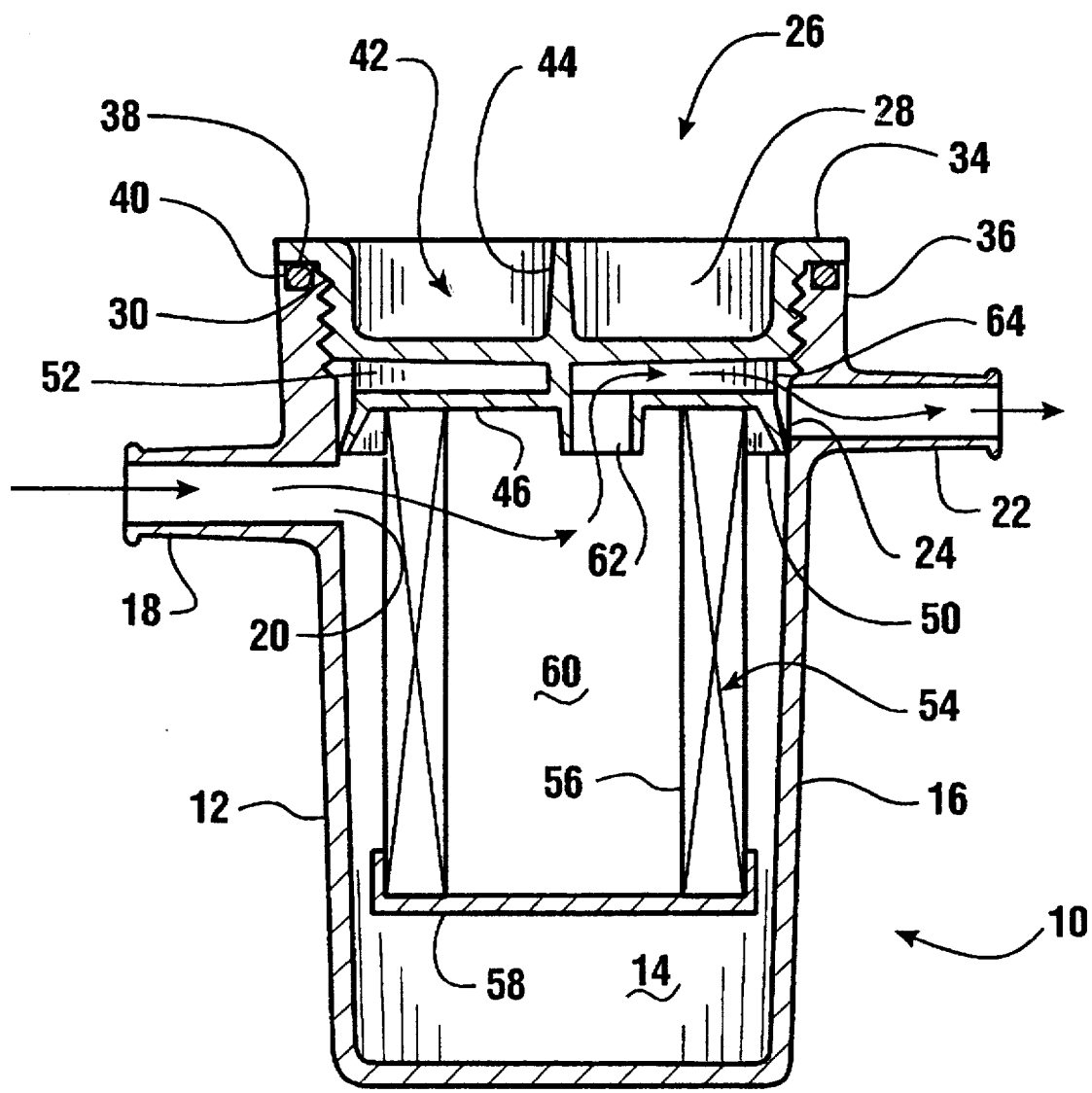
FIG. 1 is a cross sectional view of the fuel filter assembly with replaceable element of a first embodiment of the present invention.

Referring now to the drawings and particularly to FIG. 1, there is shown therein a first embodiment of the fuel filter assembly with replaceable element of the present invention, generally indicated 10. The assembly includes a housing 12. Housing 12 encloses a chamber 14. Chamber 14 is bounded by an annularly extending side wall 16. The interior surface of side wall 16 is tapered slightly outward from bottom to top.

Housing 12 includes an inlet for admitting fuel to chamber 14 through an aperture 20 in wall 16. Housing 12 further includes an outlet 22. Outlet 22 is in fluid communication with chamber 14 through a second aperture 24 in wall 16. Aperture 24 is disposed vertically above aperture 20, and is disposed angularly therefrom.

A replaceable element generally indicated 26, is mounted in housing 12. Element 26 includes a cap portion 28. Cap portion 28 is adapted for closing a circular opening 30 at the top of annular wall 16. Cap portion 28 includes external threads 32 for engaging threads which extend about the top of annular wall 16 adjacent the opening.

Cap portion 28 further includes a radially extending flange portion 34. Flange portion 34 is adapted for overlying and engaging a rim portion 36 of housing 12 which extends circumferentially about opening 30. A seal 38 nests in a recess 40 which extends circumferentially about rim portion 36. Seal 38 maintains the cap portion of the element and the housing in fluid tight relation when said element is installed therein.

Cap portion 28 further includes manually engaging recesses 42 to facilitate holding and turning the cap portion. In the preferred form of the invention, the cap portion has two recesses divided by a projection 44.

Element 26 further includes a disk shaped member 46 which is disposed below cap portion 28 when the element is installed. In the embodiment shown, disk shaped member 46 is held to cap portion 28 by a cross shaped web 48 (see FIG. 3). Web 48 is preferably integrally formed with cap portion 28 and disk shaped member 46, all of which are preferably made of plastic material.

Disk shaped member 46 includes a lip portion 50 which extends radially outward and downward. Lip portion 50 is deformable and serves as engaging means for engaging annular wall 16 in a generally fluid tight relation about its full circumference. As a result, when element 26 is installed in housing 12, member 46 serves as dividing means and fluidly divides an area of the chamber 14 below the disk shaped member, from an intermediate area 52 between the disk shaped member and the cap portion.

Element 26 further includes a media body 54. Media body 54 includes a ring of filtration media 56 which is operable to remove impurities from the fuel as it flows therethrough.

The media body 54 is bounded at its lower end by an imperforate end cap 58. End cap 58 is secured to the media 56 by potting compound or other suitable adhesive sealant. Likewise, the upper end of media 56 is secured to member 46 by similar potting compound. As a result, the media surrounds an interior area 60 inside the media body 54, which interior area may be reached only by clean fuel that has passed through media 56.

Interior area 60 is in fluid communication with area 52 through a fluid passage 62 through member 46. Fluid passage 62 is disposed away from web 48. However, end walls 64 of the web are disposed away from the annular wall 16 when the element 26 is installed in the assembly. This enables fuel to flow without restriction about the entire outer circumference of area 52.

In operation, fuel such as diesel fuel which is used to power a diesel engine of a truck, is supplied from a tank or other source of supply to housing 12 through inlet 18. The fuel enters chamber 14 through aperture 20. The fuel from the chamber then flows through the media 56 to the interior area 60. As the fuel flows through the media, impurities are removed. These impurities, such as dirt and water, tend to drop to the bottom of chamber 14 from which they may be periodically removed through a drain valve or other device for removing impurities (not shown).

From the interior area 60, the clean fuel passes upward into area 52 through fluid passage 62 in disk shaped member 46. Because lip portion 50 of member 46 engages annular wall 16 below aperture 24, clean fuel flows out of area 52 through aperture 24 and is delivered from the housing through outlet 22.

When element 26 is to be changed, cap portion 28 is manually engaged by recesses 42 and projection 44. The cap portion is rotated to disengage threads 32 from the threads on the wall adjacent opening 30. As the element is rotated, lip portion 50 of member 46 rubs against wall 46 shaking loose dirt that may have accumulated in the area of the annular wall under member 46.

As element 26 is rotated, it moves upward by action of the threads. Such upward movement causes the fuel level inside chamber 14 to fall. Once the threads are disengaged, removal of the element results in a further lowering of the fuel level inside the chamber. As a result, dirty fuel is maintained away from aperture 24. As the element is removed, the passage of lip portion 50 over aperture 24 also tends to keep impurities away and prevents them from passing to the outlet.

A new element is installed in the housing by inserting the element, media first into the chamber, and moving the element downward through opening 30. As element 26 moves downward, lip portion 50 engages wall 16 and is deformed inward to provide fluid tight engagement. The wiping action of the lip portion over aperture 24 further helps to prevent impurities from flowing into the outlet.

The present invention enables an element change without skin contact with the fuel and without fuel spillage. The element change may also be achieved without dirty fuel passing to the outlet of the assembly.

The fuel filter assembly of the present invention may be readily manufactured which results in reduced cost. The housing is a design which may be readily cast of plastic or metal material. The housing design requires no special provisions for the inlet or outlet other than straight openings which are readily cast or machined.

The element of the first embodiment is readily made with the cap portion, web and disk shaped member integrally formed of plastic material. In other embodiments of the invention, the bottom end cap may be held to the disk shaped member with a fastening member instead of potting compound. This enables reuse of all the components of the element except for the media body. Such a construction may be desirable for purposes of reducing waste, and may be accomplished through use of suitable support rings for the media and seals to ensure that fuel is required to pass through the media to reach the interior area of the element.

Figure 4:
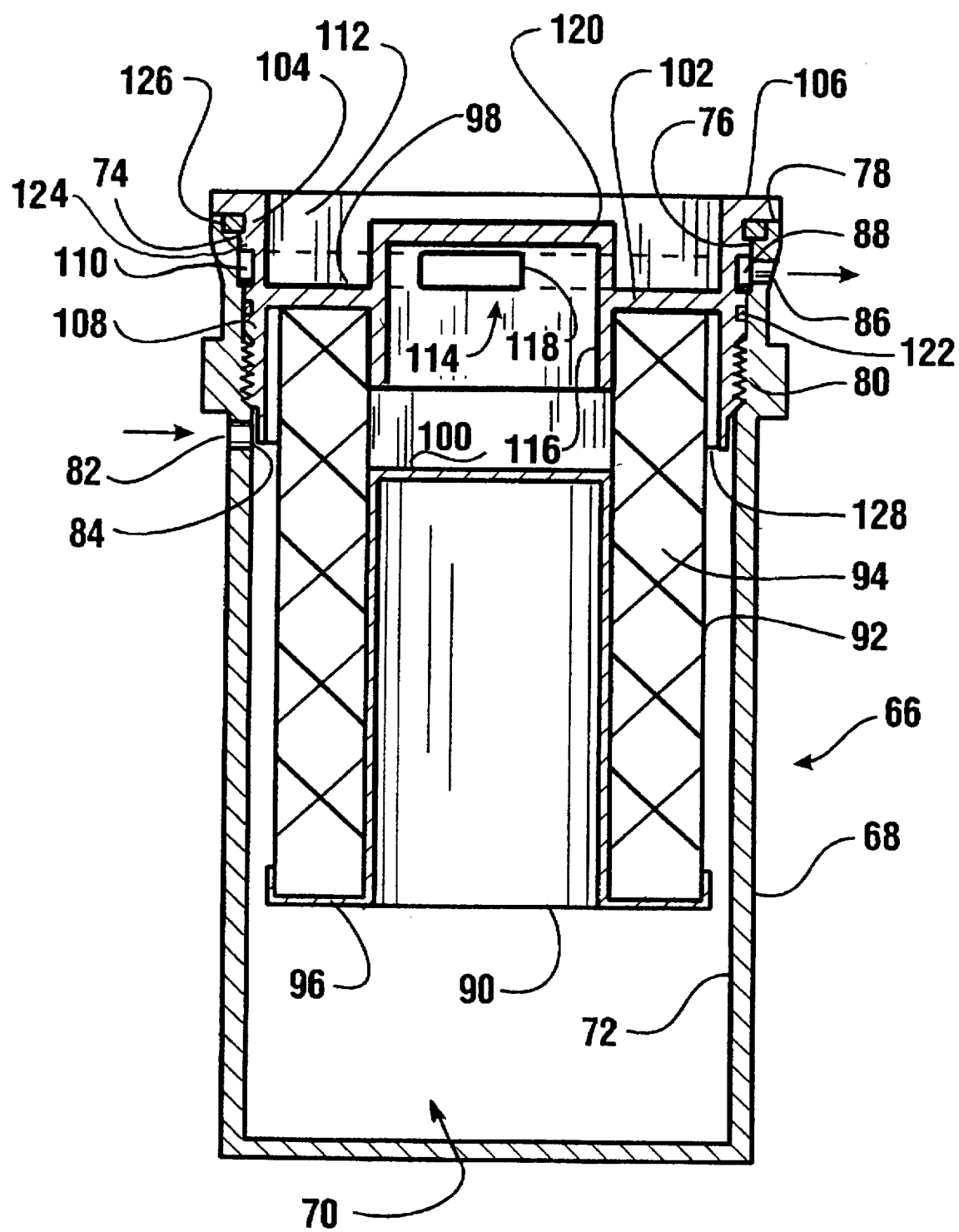
FIG. 4 is a cross sectional side view of a second embodiment of the fuel filter assembly with replaceable element of the present invention.
Figure 5:
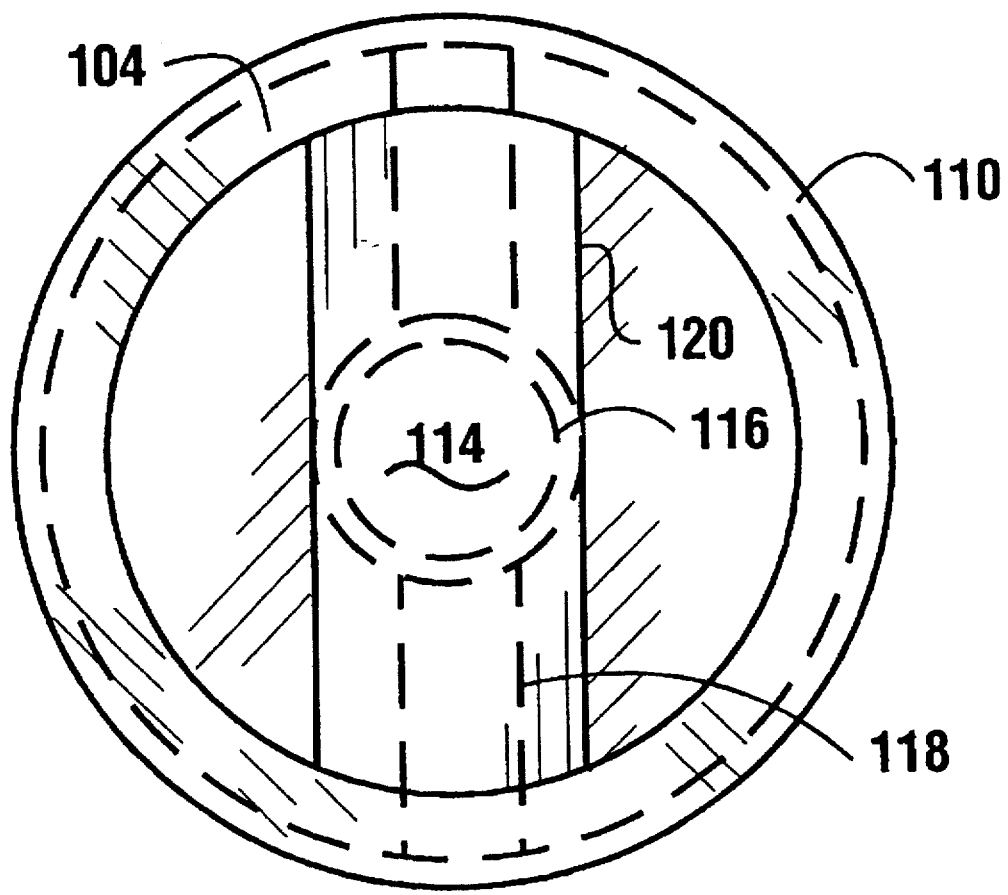
FIG. 5 is a top view of the assembly shown in FIG. 4.

A second embodiment of the invention is shown in FIGS. 4 and 5. The second embodiment is a filter assembly generally indicated 66. Assembly 66 has a housing 68, which has an internal chamber 70.

Chamber 70 is bounded interiorally by a lower annular wall 72 and an upper annular wall 74. Upper annular wall 74 is adjacent an opening 76 in the housing. Opening 76 is bounded by a radially extending step 78. A threaded area 80 extends in the housing between the upper and lower annular walls. Upper annular wall 74 is slightly larger in diameter than the lower annular wall 72.

An inlet opening 82 extends through housing 68. Inlet opening 82 is in fluid communication with a first aperture 84 in wall 72. An outlet opening 86 extends through housing 68 and is in fluid communication with a second aperture 88 in upper wall 74.

An element 90 is removably mounted in chamber 70. Element 90 includes a media body 92 which is comprised of a continuous ring of filter media 94. The media body 92 is bounded at its lower end by an imperforate end cap 96 which is attached to the media by potting compound. The media is bounded at its upper end by a cap portion 98 which is also attached with potting compound. The ring of a media, end cap 96 and cap portion 98 enclose an interior area 100 of the element.

Cap portion 98 includes a disk shaped portion 102. Disk portion 102 engages an annular upright portion 104 which terminates upwardly in a radially extending flange portion 106 that overlies rim 78 when the element is installed.

Upright portion 104 includes an annularly extending projection 108. Projection 108 engages upper annular wall 74, and serves as dividing means for dividing the area of the chamber 70 below projection 108 from an area 110 vertically above the projection. Area 110 is bounded by a circumferentially extending recess 112 in upright portion 104 of cap portion 98. As shown in FIG. 4, recess 112 is aligned with second aperture 88 when element 90 is installed. As a result, area 110 is in direct fluid communication with outlet opening 86.

Cap portion 98 also includes an extending chamber 114 vertically above interior area 110 of the element. Chamber 114 is bounded by a circular wall 116. Wall 116 extends downward to support media 94, as well as upward. A pair of slots 118 extend radially outward from chamber 114 (see FIG. 5). The slots place chamber 114 in fluid communication with area 110. The exterior of cap portion 98 includes a central rib 120 which facilitates manual engagement of the element.

Cap portion 98 also includes a resilient first circumferentially extending seal 122 which is housed in a recess in annularly extending projection 108. Seal 122 has an outer lip (not separately shown) for engaging upper wall 74. A second annular projection 124 extends above recess 112 in the upright portion. Projection 124 engages wall 74 and further holds area 110 in fluid tight relation. A second resilient seal 126, vertically above second projection 124, further seals area 110 and prevents leakage.

Upright portion 110 has a skirt area 128 below first projection 108. Skirt area 128 includes threads for engaging threaded area 80 of the housing. The skirt area is also disposed radially away from the outer surface of the media 94.

In operation, liquid fuel enters inlet opening 82 and flows into chamber 70 through first aperture 84. The liquid passes through the media 94 of media body 92 to interior area 100. The passage of the liquid through the media removes contaminants.

The clean fuel passes into extending chamber 114 and flows outward through slots 118. The fluid flows from the slots into area 110 bounded by recess 112. The liquid flows circumferentially through area 110 and passes into second aperture 88. Fluid flowing out second aperture 88 leaves the housing through outlet opening 86.

The embodiment shown in FIGS. 4 and 5 has the advantage that the aperture in fluid communication with the outlet is vertically and radially disposed from the level of the dirty fuel in the housing when the element is removed. The position of first seal 122, threaded area 80 and skirt area 128 also serve to keep contaminants away from aperture 88. As in the first embodiment, the element of the second embodiment may be changed without spilling fuel into the environment.

While the preferred embodiments of the invention use an element with outside-in flow, other embodiments of the invention may include an element that has inside-out flow. Other embodiments of the invention may also have additional features that are conventionally used with fuel filter assemblies, such as a vent for venting air out of the filter housing and for adding fuel. A heater for heating the fuel in cold temperatures may also be used.

Thus, the fuel filter assembly with replaceable element of the present invention achieves the above stated objectives, eliminates difficulties encountered in the use of prior devices, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given are by way of examples and the invention is not limited to the details shown or described.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

We claim:

1. A filter assembly for filtration of liquid comprising:

a housing including a chamber means, said housing including an opening therethrough to said chamber means, said chamber means having a closed end opposite said opening in said housing and being bounded by a generally longitudinally extending, imperforate annular wall;

inlet port means for delivering liquid into said housing;

outlet port means for delivering liquid from said housing;

said inlet and outlet port means being in fluid communication with said chamber means through respective apertures in said annular wall that are longitudinally spaced apart along the longitudinal extent of said annular wall and longitudinally spaced from the closed end of said chamber means; and a removable element in said chamber means, said element including an interior area and an exterior area divided by media means for removing contaminants from liquid passing therethrough, said exterior area in fluid communication with one of said inlet and outlet port means;

said element means further including a dividing means for fluidly dividing a first area in said chamber means from a second area, said dividing means including second fluid passage means therethrough, said second fluid passage means providing fluid communication between said interior area and said second area, said dividing means further including resilient annular radially extending deformable engaging means deformably engaged circumferentially about said annular wall, and wherein said apertures are respectively located in said first and second areas; and closure means for removably closing said opening in said housing; comprising:

a closure portion for closing said opening, said closure portion being externally threaded at its outer diameter, whereby the filter element is screwable into the housing;

a dividing means for fluidly dividing said chamber means, said dividing means longitudinally disposed from said closure portion and adapted for dividing a first area from a second area, said dividing means including resilient annular radially extending deformable engaging means for deformably engaging said annular wall circumferentially; filter media loop means adhesively attached at an open end thereof to said dividing means for removing contaminants from liquid flowing therethrough, said media loop means fluidly disposed between said first and second areas, said dividing means having a central portion surrounded by said deformable engaging means, said central portion longitudinally spaced from said closure portion and extending radially inwardly beyond a radially innermost annular surface of said media loop means adjacent said open end of said media loop means and including one end of a fluid passage connected to an interior area of said media loop means, and said fluid passage having an end opposite said interior area opening to a radially outer wall of said dividing means.

2. The filter assembly according to claim 1 wherein said deformable engaging means comprises an annular lip portion extending in an angular direction longitudinally and radially outwardly with respect to a center axis of said central portion.

3. A filter assembly comprising:

a housing including a chamber, the housing including an opening to said chamber, said chamber bounded by a generally longitudinally extending, imperforate annular wall adjacent said opening;

a first fluid port and a second fluid port;

said second port being connected to said chamber through an aperture in said annular wall;

a removable filter element in said chamber, said filter element a ring of media having at least one open end, a disk-shaped body adhesively attached to said media ring at said open end and having a central portion extending radially inwardly beyond a radially innermost annular interior surface of said media ring adjacent said open end of said media ring; and an annular resilient radially extending deformable portion in fluid tight connection with said disk-shaped body and extending radially outward beyond said media ring, said deformable portion being deformably engageable circumferentially with said longitudinally extending annular wall, and said disk-shaped body including a fluid passage communicating at one end to an interior of said media ring and opening at its other end to a radially outer wall of said disk-shaped body; and wherein said disk-shaped body is externally threaded at its outer diameter, whereby the filter element may be screwed into said housing.

4. The filter assembly according to claim 3 wherein said annular wall is slightly tapered outwardly adjacent said deformable portion.

5. The filter assembly according to claim 4 wherein said opening in said housing is bounded by an annular outward extending rim portion, and said disk-shaped body has a cap portion including an annular flange portion overlying said rim portion.

6. The filter assembly according to claim 5 and further comprising seal means extending between said flange portion and said rim portion for sealing said portions in fluid tight engagement.

7. The filter assembly according to claim 6 wherein said cap portion includes recess means for manual engagement of said cap portion.

8. The filter assembly according to claim 7 wherein said first fluid port is connected to said chamber through another aperture in said annular wall at a side of said lip portion opposite the aperture connecting said second port to said chamber.

9. The filter assembly according to claim 3 wherein said first fluid port is connected to said chamber through another aperture in said annular wall at a side of said lip portion opposite the aperture connecting said second port to said chamber.

10. A removable filter element for a liquid filter assembly, said assembly including a housing having an inlet port means and a chamber means, the chamber means having an opening, and said chamber means bounded by a generally longitudinally extending annular wall adjacent said opening, one of said port means in fluid communication with a first aperture in said annular wall, said element comprising:

a closure portion for closing said opening, said closure portion being externally threaded at its outer diameter, whereby the filter element is screwable into the housing;

a dividing means for fluidly dividing said chamber means, said dividing means longitudinally disposed from said closure portion and adapted for dividing a first area from a second area, said dividing means including resilient annular radially extending deformable engaging means for deformably engaging said annular wall circumferentially; filter media loop means adhesively attached at an open end thereof to said dividing means for removing contaminants from liquid flowing therethrough, said media loop means fluidly disposed between said first and second areas, said dividing means having a central portion surrounded by said deformable engaging means, said central portion longitudinally spaced from said closure portion and extending radially inwardly beyond a radially innermost annular surface of said media loop means adjacent said open end of said media loop means and including one end of a fluid passage connected to an interior area of said media loop means, and said fluid passage having an end opposite said interior area opening to a radially outer wall of said dividing means.

11. The filter element according to claim 10 wherein said engaging means of said dividing means comprises a resilient radially outward extending lip portion adapted for engaging said annular wall.

12. The filter element according to claim 11 and further comprising web means for connecting said closure portion and said dividing means, said web means adapted for providing unrestricted fluid communication circumferentially in said second area adjacent said annular wall.

13. The filter element according to claim 12 wherein said lip portion extends in an angled direction longitudinally and radially outwardly.

14. The filter element according to claim 13 wherein said closure portion includes thread means for engaging said annular wall.

15. The filter element according to claim 14 wherein said assembly includes a radially outward extending rim portion adjacent said opening, and said closure portion of said filter element further comprises an annular, radially outward extending flange portion for engaging said rim portion.

16. The filter element according to claim 15 and further comprising manual engagement means on said closure portion for facilitating manual rotation of said closure portion.

17. A filter element comprising:

a ring of media having at least one open end, a disk-shaped body adhesively attached to said media ring at said open end and having a central portion extending radially inwardly beyond a radially innermost annular interior surface of said media ring adjacent said open end of said media ring; and an annular resilient radially extending deformable portion in fluid tight connection with said disk-shaped body and extending radially outward beyond said media ring, said deformable portion being deformably engageable circumferentially with a longitudinally extending annular wall of a filter housing, and said disk-shaped body including a fluid passage communicating at one end to an interior of said media ring and opening at its other end to a radially outer wall of said disk-shaped body; and wherein said disk-shaped body is externally threaded at its outer diameter, whereby the filter element may be screwed into the filter housing.

18. A filter element according to claim 17 wherein said fluid passage extends through a radially extending rib on said disk-shaped body.

19. A filter element according to claim 17 wherein said disk-shaped body includes a relatively thinner disk-shaped member and a cap portion longitudinally disposed of said disk-shaped member, said disk-shaped member and said cap portion defining therebetween a portion of said fluid passage.

20. A filter element according to claim 17 wherein said radially outer wall of said disk-shaped body has an arcuately extending recess therein, and wherein said deformable portion is longitudinally positioned on a first longitudinal side of said recess and wherein said element further comprises a further annular deformable portion on a longitudinally opposed side of said recess, said further deformable portion deformably engageable circumferentially with the annular wall.

21. A filter element as set forth in claim 17, wherein said deformable portion has a radially outer portion which circumferentially surrounds said media ring and is radially outwardly spaced apart from said media ring around the entire media ring, whereby said radially outer portion is free to deform radially inwardly.

22. A filter element as set forth in claim 17, wherein said disk-shaped body has at the outer diameter thereof an annular recess at said radially outer wall of said disk-shaped body, and said other end of said fluid passage opens to said radially outer wall at said annular recess.

23. A removable filter element acceptable in a filter housing, said housing having a longitudinally extending, imperforate annular wall, said annular wall bounding a chamber formed therein, said chamber having an opening adjacent a longitudinal end of said wall and a closed end opposite said opening in said housing, said housing further including an inlet port and an outlet port, said inlet port fluidly connected to said chamber through a first aperture in said annular wall, and said outlet port fluidly connected to said chamber through a second aperture in said annular wall, said element comprising:

a closure portion for closing said opening, said closure portion being externally threaded at its outer diameter, whereby the filter element is screwable into the housing;

a disk shaped member, said disk shaped member longitudinally disposed from said closure portion and adapted for fluidly dividing a first area from a second area in said housing, wherein said first area includes said first aperture and said second area includes said second aperture, said disk shaped member including a radially outward extending lip portion deformably engageable with said annular wall circumferentially; and a ring of filter media adhesively attached to said disk shaped member enabling removal of contaminants from liquid flowing therethrough, wherein said media is fluidly disposed between said first and second areas, and said disk shaped member extends radially inwardly beyond a radially innermost annular surface of said filter media at an adjacent open end of said filter media partially closed by said disk shaped member.

24. The filter element according to claim 23 wherein said filter media is annular, said annular media bounding an interior area, whereby fluid is enabled to pass from said inlet port to said interior area through said annular media.

25. The filter element according to claim 24 wherein said disk shaped member further comprises a fluid passage, whereby said interior area is enabled to be in fluid communication with said outlet port through said fluid passage.

26. The filter element according to claim 23 and further comprising a web connecting said closure portion and said disk shaped member, said web enabling unrestricted fluid communication circumferentially adjacent said annular wall in said second area.

27. The filter element according to claim 23 wherein said lip portion extends in an angled direction longitudinally and radially outwardly.

28. The filter element according to claim 27 wherein said closure portion includes threads whereby said closure portion is engageable with a threaded area on said annular wall.

29. The filter element according to claim 28 wherein said housing includes a radially outward extending step portion adjacent said opening, and wherein said closure portion of said filter element further comprises an annular, radially outward extending flange portion engageable with said step portion.

30. The filter element according to claim 29 and further comprising a first annular resilient seal engageable with said closure portion and said step portion in fluid tight relation.

31. The filter element according to claim 28 and further comprising manually engageable recesses on said closure portion whereby said recesses facilitate manual rotation of said closure portion.

32. The filter element according to claim 23 wherein said lip portion further includes a resilient annular seal, said seal deformably engageable with said annular wall circumferentially.

* * * * *